United States Patent [19]

Chassot

[11] Patent Number: 5,346,545
[45] Date of Patent: Sep. 13, 1994

[54] STABILISATION OF ORGANIC PIGMENTS
[75] Inventor: Laurent Chassot, Praroman, Switzerland
[73] Assignee: Ciba-Geigy Corporation, Ardsley, N.Y.
[21] Appl. No.: 26,962
[22] Filed: Mar. 5, 1993
[30] Foreign Application Priority Data Mar. 5, 1992 [CH] Switzerland .................. 693/92

[51] Int. Cl.$^5$ .................................. C09B 67/50
[52] U.S. Cl. ........................ 106/410; 106/494; 106/495; 106/496; 106/497; 106/498; 106/499; 106/500; 106/505; 106/493
[58] Field of Search ............. 106/493, 494, 495, 496, 106/497, 498, 499, 500, 505, 410

[56]        References Cited
        U.S. PATENT DOCUMENTS

| | | | |
|---|---|---|---|
| 3,536,722 | 10/1970 | Murayama et al. | 546/20 |
| 3,936,456 | 2/1976 | Ramey et al. | 544/231 |
| 3,966,711 | 6/1976 | Rasberger | 540/492 |
| 3,970,632 | 7/1976 | Yashiura et al. | 524/87 |
| 3,971,757 | 7/1976 | Rasberger | 524/106 |
| 4,131,599 | 12/1978 | Brunetti et al. | 524/102 |
| 4,415,685 | 11/1983 | Igbal et al. | 524/92 |
| 4,579,949 | 4/1986 | Roehat et al. | 546/167 |
| 4,838,943 | 6/1989 | Bitterli et al. | 106/400 |
| 4,866,113 | 9/1989 | Bitterli et al. | 524/87 |
| 4,920,228 | 4/1990 | Lai et al. | 546/244 |
| 5,001,233 | 3/1991 | Murray et al. | 540/29 |

FOREIGN PATENT DOCUMENTS

| | | |
|---|---|---|
| 0241419 | 10/1987 | European Pat. Off. . |
| 309401 | 3/1989 | European Pat. Off. . |
| 50-58141 | 5/1975 | Japan . |
| 57-119941 | 7/1982 | Japan . |
| 299323 | 4/1990 | Japan . |

OTHER PUBLICATIONS

Lahn F. W. Keana, "Neever Aspects of the Synthesis and Chemistry of Nitroxide Spin Lables Chem. Reviews", vol. 78, No., 1 (1978) pp. 37–64.
Volodarsky–Imidazoline Nitroxides vol I pp. 5–23 no date.
Tetrahedron Letters, vol. 29, No. 37 pp. 4677–4680 (1988).
S. Org. Chem. 1991, 56, pp. 6110–6114.
Journal of Polymer Science. Kurasaki et al. vol. 12, 1407–1420 (1974).

*Primary Examiner*—Karl Group
*Assistant Examiner*—Scott L. Hertzog
*Attorney, Agent, or Firm*—George R. Dohmann; Luther A. R. Hall; Michele A. Kovaleski

[57]            ABSTRACT

Pigment compositions comprising
a) at least one organic pigment chosen from the group comprising azo pigments, quinacridones, phthalocyanines, indanthrones, flavanthrones, pyranthrones, anthraquinones, perylenes, dioxazines, perinones, thioindigo, isoindolines, isoindolinones and metal complexes and
b) 1 to 100% by weight, based on the pigment, of a nitroxyl compound consisting of at least one unsubstituted or substituted 5-, 6- or 7-membered heterocyclic ring containing a divalent group of the formula

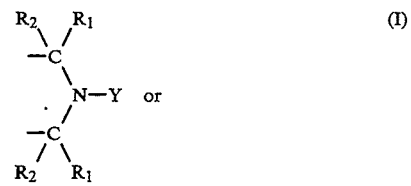

(I)

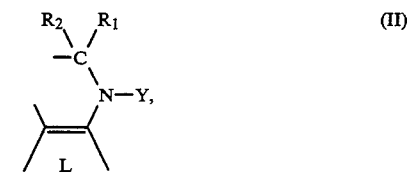

(II)

in which
$R_1$ and $R_2$ independently of one another are methyl, ethyl or phenyl, or together form a 4- to 12-membered aliphatic ring,
L is an aromatic radical
and Y is O.,
or of an acid addition salt thereof.

These pigment compositions are distinguished by an outstanding resistance to light and weathering.

12 Claims, No Drawings

STABILISATION OF ORGANIC PIGMENTS

The present invention relates to the stabilisation of organic pigments against the influence of light and weather by the addition of nitroxyl compounds.

It is known that not all organic pigments always have a very good fasmess to light and weathering. Nevertheless, some of them have proved to be valuable pigments. Although they already have a very good resistance to light and weathering, it has now been found that, surprisingly, this can be improved further, especially in transparent pigment forms, if the pigments are mixed with a nitroxyl compound.

Nitroxyl compounds are known as stabilisers from various publications. In JP-A 75-58141, amongst many other HALS (hindered amine light stabilisers), nitroxyl compounds which, together with UV absorbers, serve to stabilise pigmented plastics against the influence of light are also described. It is stated that the action of UV absorbers as light stabilisers for the plastic is impaired by the pigments, but that this impairment can be reduced by a HALS. HALS which contain no nitroxyl group axe preferred. The use of N-hydroxy-HALS for preventing deficiencies such as embrittlement, cracking, corrosion, erosion, loss of gloss, chalking and yellowing is known from EP-A 309 401. A polymer mass which comprises a quinophthalone pigment and, thanks to the addition of HALS, has a high light stability and resistance to fading is described in U.S. Pat. No. 3 970 632. Although nitroxyl compounds are also included quite generically, only HALS which are free from nitroxyl groups are mentioned specifically. Pigmented polymers comprising a UV absorber and a HALS (without reference to nitroxyl compounds) for the prevention of fading are known from JP-A 82-119 941. Laminates which are stabilised against fading by the action of light and comprise, in an intermediate layer, a dyestuff (erroneously called pigment) which is soluble in an organic solvent and has been treated with a nitroxyl compound in the dissolved form are described in JP-A 90-99 323. For the expert, these publications reveal the teaching that in the case of plastics dyed with soluble dyestuffs, fading by the action of light can be reduced under certain conditions, for example in intermediate layers of laminates, with treatment of the dissolved dyestuffs with a nitroxyl compound, but that the same effect is achieved in plastics pigmented with pigments, together with the stabilisation of the plastic, by admixing a HALS which is free from nitroxyl groups.

It has now been found, quite surprisingly, that even the already high resistance of certain pigments to light and weathering can be improved further by mixing or coating of the pigment particles with a nitroxyl compound.

The present invention accordingly relates to light-stabilised pigment compositions comprising a) at least one organic pigment chosen from the group comprising azo pigments, quinacridones, phthalocyanines, indanthrones, flavanthrones, pyranthrones, anthraquinones, perylenes, dioxazines, perinones, thioindigo, isoindolines, isoindolinones and metal complexes and b) 1 to 100% by weight, based on the pigment, of a nitroxyl compound consisting of at least one unsubstituted or substituted 5-, 6- or 7-membered heterocyclic ring containing a divalent group of the formula

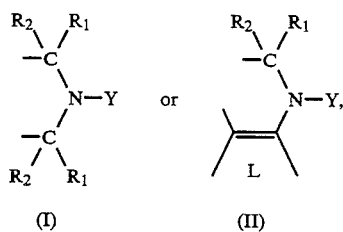

in which

R₁ and R₂ independently of one another axe methyl, ethyl or phenyl, or together form a 4- to 12-membered aliphatic ring, L is an aromatic radical and Y is O., or of an acid addition salt thereof.

Particularly suitable pigments are those of the isoindoline, isoindolinone, metal complex, monoazo and, in particular, the bisazo, quinacridone, phthalocyanine, anthraquinone and perylene series. These are generally known and in some cases commercially obtainable products. The pigments axe preferably used in fine form, i.e. in transparent form, with an average particle size of 0.005 to 0. 1 μm, preferably 0.01 to 0.07 μm.

The nitroxyl compounds are likewise known compounds. They arc disclosed, for example, in the following publications:

Chemical Reviews, 1978, Volume 78, No. 1, 37–64. (J. F. W. Keana, Newer Aspects of the Synthesis and Chemistry of Nitroxide Spin Labels), in particular pages 40–47;

Imidazoline Nitroxides, 1988, Volume 1, 5–23 (L. B. Volodarsky, I. A. Grigorev, Synthesis of Heterocyclic Nitroxides);

Tetrahedron Letters, Volume 29, No.: 37, 4677–4680, 1988 (R. W. Murray, M. Singh, A Convenient High Yield Synthesis of Nitroxides);

J. Org. Chem, 1991, Volume 56, 6110–6114 (Z. Ma, J. M. Bobbitt, Organic Oxoammonium Salts), in particular the examples on page 6114;

Journal of Polymer Science (Polymer Chemistry Edition), 1974, Volume 12, 1407–1420 (T. Kurosald et al., Polymers Having Stable Radicals), in particular the examples on pages 1417–1419;

U.S. Pat. No. 3 536 722, formula I and, in particular, Examples 1–6;

U.S. Pat. No. 3 936 456, columns I and 2 and, in particular, Examples 7 and 8;

U.S. Pat. No. 3 971 757, formula I and Example 12;

U.S. Pat. No. 3 966 711, formula I and Example 7;

U.S. Pat. No. 4 131 599, columns 1 and 2 and Example 5; and

U.S. Pat. No. 5 001 233, in particular Example 1.

Any novel nitroxyl compounds as defined above which can be used can be prepared by methods analogous to generally known methods.

The nitroxyl compound is preferably employed in an amount of 5–100% by weight, based on the pigment.

R₁ and R₂ are preferably methyl.

Inorganic or organic salts of nitroxyl compounds, which are formed by addition of acids in maximum mounts equivalent to the nitroxyl groups, can also be used. Such acids can be inorganic acids, such as, for example, sulfuric, hydrochloric or phosphoric acid, or organic carboxylic acids, such as formic, acetic, oxalic, maleic, benzoic or salicylic acid, organic sulfonic acids, such as methane- or p-toluenesulfonic acid, or organic phosphorus-containing acids, such as benzenephosphonic acid, methanephosphonic acid or benzenephosphinic acid.

Pigment compositions which are of particular interest are those in which a nitroxyl compound of the formula

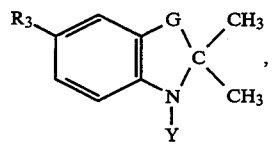  (III)

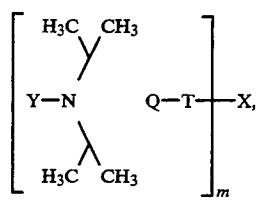  (IV)

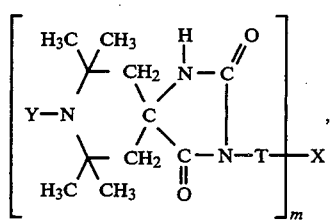  (V)

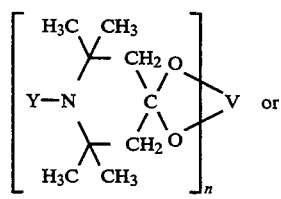  (VI)

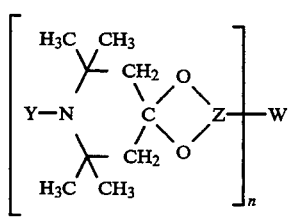  (VII)

is used, in which

R$_3$ is C$_1$-C$_{18}$alkyl or C$_1$-C$_{18}$alkoxy,

G is a divalent group of the formula —CR$_4$=CH— or —CH$_4$—CH$_2$— and

R$_4$ is C$_1$-C$_{18}$alkyl,

Q is a group of the formula

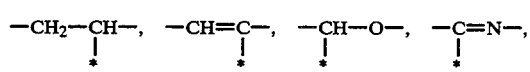

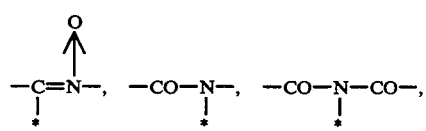

-continued

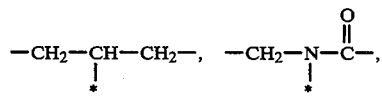

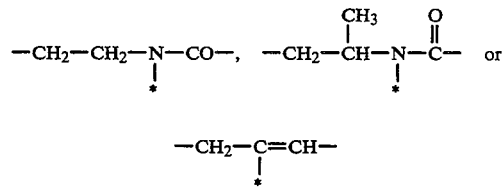

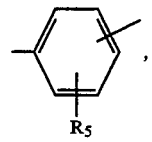

in which the bond labelled * is the bond leading to T, T is a direct bond or a group of the formula

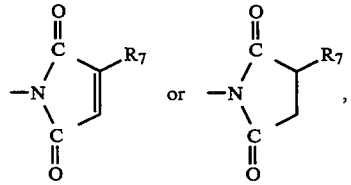

in which R$_5$ is hydrogen, halogen or C$_1$-C$_4$alkyl, or —(CH$_2$)$_r$—, in which r is 1 or 2, m is the number 1, 2, 3, 4 or 6, X, if m=1, is hydrogen, C$_1$-C$_{18}$alkyl, phenyl which is unsubstituted or substituted by C$_1$-C$_4$alkyl, C$_1$-C$_4$alkoxy, phenyl or halogen, or, under the condition that T, if bonded to a nitrogen atom, is not a direct bond, is a group of the formula —OCO—NR$_6$R$_7$, —OSO$_2$—NR$_6$R$_7$, —OCO—R$_7$, —COOR$_7$, —CONR$_6$R$_7$, —NR$_6$—COR$_7$, —NR$_6$—CONR$_6$R$_7$, —OR$_7$, —NR$_6$R$_7$ or

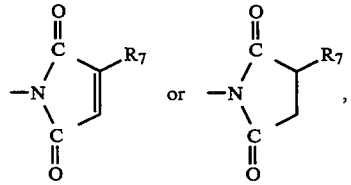

in which R$_6$ is hydrogen or C$_1$-C$_{18}$alkyl, R$_7$ is C$_1$-C$_{18}$alkyl, C$_2$-C$_{12}$alkenyl, C$_5$-C$_{12}$cycloalkyl, or phenyl or naphthyl which is unsubstituted or substituted by C$_1$∝C$_4$alkyl, C$_1$-C$_4$alkoxy, halogen, phenyl or nitro, or a group —(CH$_2$)$_s$—CHR$_8$R$_9$, s is zero, 1, 2 or 3, R$_8$ is hydrogen, methyl or phenyl and R$_9$ is —OH, halogen or a group —COOCH$_3$ or —COOC$_2$H$_5$ and, if m=2, is a group of the formula —(CH$_2$)$_p$ or, under the condition that T, if bonded to a nitrogen atom, is not a direct bond, is a group of the formula —O—(CH$_2$)$_p$—O—, —NR$_6$—(CH$_2$)$_p$—NR$_6$—, in which F is —(CH$_2$)$_p$—,

and p is a number between 2 and 10, and, if m=3, is a group

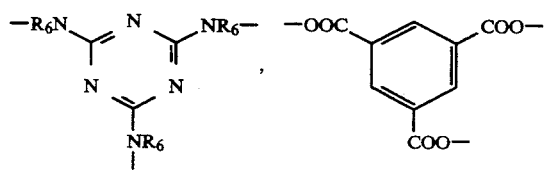 or

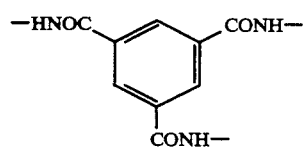

and, if m=4, is a group

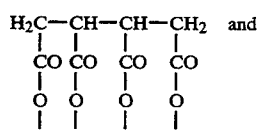

if m=6, is a group

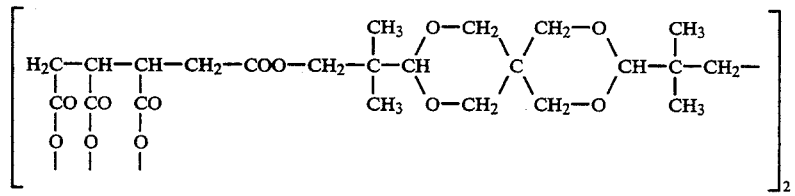

n is the number 1 or 2,

V, if n=1, is $C_2$–$C_8$alkylene or hydroxyalkylene or $C_4$–$C_{22}$acyloxyalkylene, and, if n=2, is the group (—$CH_2$)$_2$C($CH_2$—)$_2$ or

and

Z is a group of the formula

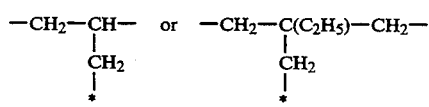

in which the bond labelled with * is the bond leading to W,

W, if n=1, is a group —$OCOR_{10}$, in which $R_{10}$ is $C_1$–$C_{18}$alkyl, or phenyl or naphthyl which is unsubstituted or substituted by $C_1$–$C_4$alkyl, $C_1$–$C_4$alkoxy or halogen, and, if n=2, is a group of the formula —OCO—($CH_2$)$_p$—COO— or

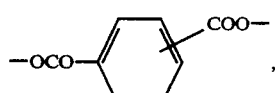

and

Y is O.

Any $C_1$–$C_4$alkyl substituents are, for example, methyl, ethyl, n-propyl, isopropyl, n-butyl, sec-butyl or tert-butyl, and any $C_1$–$C_{18}$alkyl substituents are additionally, for example, n-amyl, tert-amyl, hexyl, heptyl, octyl, 2-ethylhexyl, decyl, dodecyl, tetradecyl, hexadecyl or octadecyl;

$C_1$–$C_4$alkoxy is, for example, methoxy, ethoxy, n-propoxy, isopropoxy or butoxy, and $C_1$–$C_{18}$alkoxy is additionally, for example, hexyloxy, decyloxy, dodecyloxy, hexadecyloxy or actadecyloxy;

halogen is, for example, iodine, fluorine or, in particular, bromine, and preferably chlorine;

any $C_2$–$C_{12}$alkenyl substituents are, for example, vinyl, allyl, methallyl, 2-butenyl, 2-hexenyl, 3-hexenyl, 2-octenyl or 2-dodecenyl.

$R_7$ as $C_5$–$C_{12}$cycloalkyl is, for example, cyclopentyl, cycloheptyl, cyclooctyl, cyclononyl, cyclododecyl and, preferably, cyclohexyl.

V as $C_2$–$C_8$alkylene or -hydroxyalkylene is, for example, ethylene, 1-methyl-ethylene, propylene, 2-ethylpropylene or 2-ethyl-2-hydroxymethylpropylene, and V as $C_4$–$C_{22}$acyloxyalkylene is, for example, 2-ethyl-2-acetoxymethylpropylene.

Pigment compositions in which a nitroxyl compound of the formula IV, V or VI, as defined above, is used are of very special interest.

Particularly suitable nitroxyl compounds are those of the formula

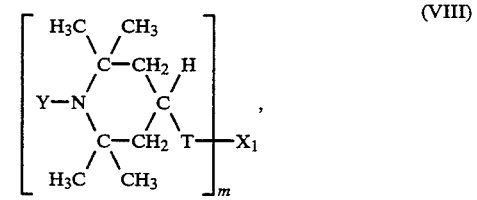 (VIII)

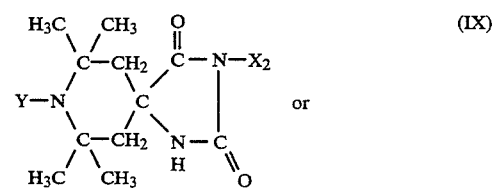 (IX)

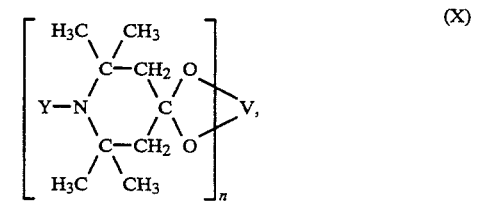 (X)

in which

T is a direct bond, m is 1, 2, or 3,

X₁, if m=1, is $C_1-C_{18}$alkyl, —OCO—R₇, —NR₆—COR₇ or

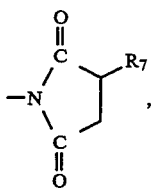

in which R₆ is hydrogen or $C_1-C_{18}$alkyl and R₇ is $C_1-C_{18}$-alkyl, or phenyl or naphthyl which is unsubstituted or substituted by $C_1-C_4$alkyl, $C_1-C_4$alkoxy, phenyl or halogen, and, if m=2, is a group —O—CO—$(CH_2)_p$—OCO— or —NR₆CO—$(CH_2)_p$+CONR₁₅—, in which p is a number between 2 and 8,

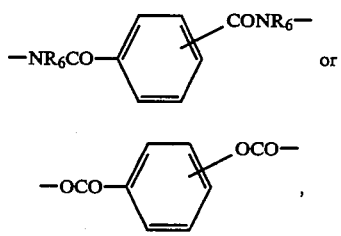

and,
if m=3, is a group

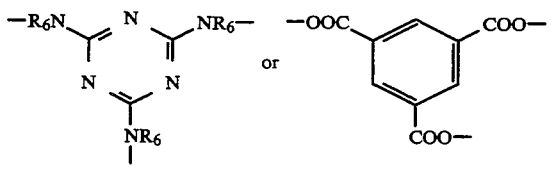

X₂ is $C_1-C_{18}$alkyl,
n is the number 2,
V is the group (—CH₂)₂C(CH₂—)₂or

and

Nitroxyl compounds of the formula VIII or IX, in which T is a direct bond, m is 1, X₁ is benzoyloxy or naphthoxyloxy and X₂ is $C_8-C_{18}$alkyl, are preferred.

As already mentioned above, the pigments are stabilised against the action of light and weather, which can lead either to fading or also to darkening of the colourations, by admixing with a nitroxyl compound. The admixing, according to the invention, of the nitroxyl compound with the pigment has proved to be effective, i.e. stabilising, in both cases. The invention furthermore accordingly relates to a process for light- and weather-stabilisation of pigments chosen from the group comprising azo pigments, quinacridones, phthalocyanines, indanthrones, flavanthrones, pyranthrones, anthraquinones, perylenes, dioxazines, perinones, thioindigo, isoindolines, isoindolinones and metal complexes by mixing or coating the pigment particles with 1 to 100% by weight, based on the pigment, of a nitroxyl compound consisting of at least one unsubstituted or substituted 5-, 6- or 7-membered heterocyclic ring containing a divalent group of the formula

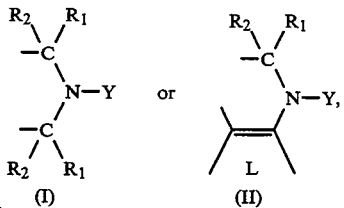

in which

R₁ and R₂ independently of one another are methyl, ethyl or phenyl, or together form a 4- to 12-membered aliphatic ring, L is an aromatic radical
and Y is O., or of an acid addition salt thereof.

This can be effected by the following various methods:

The nitroxyl compound is dissolved in an organic solvent in the desired mount. The pigment is suspended in this solution by customary methods and, if appropriate, the resulting suspension is ground in a conventional mill. The pigment mixture is isolated by distilling off the solvent and then drying;

The required amount of nitroxyl compound, dissolved in an organic solvent, is added to a pigment suspension prepared by customary methods and is then precipitated and also suspended by the addition of a solvent in which it is not soluble, for example water. The suspension is then filtered and the pigment mixture is isolated by customary methods;

Preferably, however, the pigment and the nitroxyl compound are incorporated in the desired mount by customary methods, either in premixed form or separately, into the substrate to be pigmented.

The pigment compositions according to the invention are excellently suitable as pigments for colouring high molecular weight organic material, especially if high requirements of resistance to light and weathering are imposed.

High molecular weight organic materials which can be pigmented with the pigment compositions according to the invention are, for example, cellulose ethers and esters, such as ethylcellulose, nitrocellulose, cellulose acetate and cellulose butyrate, naturally occurring resins or synthetic resins, such as polymerisation resins or condensation resins, such as aminoplasts, in particular urea- and melamine-formaldehyde resins, alkyd resins, phenolie resins, polycarbonates, polyolefins, polystyrene, polyvinyl chloride, polyamides, polyurethanes, polyesters, ABS, polyphenylene oxides, rubber, easein, silicone and silicone resins, individually or as mixtures.

The pigment compositions according to the invention are particularly suitable for colouring polyvinyl chloride and polyolefins, such as polyethylene and polypropylene, and for pigmenting varnishes, paints and printing inks. Due to their high light fastness, however, they are also particularly suitable for use in electrophotographic materials (for example photocells), colour filters (for example liquid crystal displays), information storage materials (optical discs), non-linear optical materials and in optical limiters.

However, the pigment compositions according to the invention are preferably suitable for colouring aqueous and/or solvent-containing varnishes, in particular automobile varnishes. They are especially preferably used for effect finishes in which transparent organic pigments are employed.

The high molecular weight organic compounds mentioned can be present individually or in mixtures as plastic compositions, melts or in the form of spinning solutions, varnishes, paints or printing inks. Depending on the intended use, it proves advantageous to employ the pigment compositions according to the invention as toners or in the form of preparations.

The pigment compositions according to the invention can be employed in an mount of 0.01 to 40% by weight, preferably 0.1 to 20% by weight, based on the high molecular weight organic material to be pigmented.

The high molecular weight organic substances are pigmented with the pigment compositions according to the invention, for example, by admixing such a pigment composition, if appropriate in the form of masterbatches, or the individual components to these substrates using roll mills or mixing or grinding apparatuses. The pigmented material is then brought into the desired final form by processes which are known per se, for example calendering, pressing, extrusion, brushing, casting or injection moulding. To produce non-rigid mouldings or to reduce their brittleness, it is often desirable to incorporate so-called plasticisers into Me high molecular weight compounds before shaping. Plasticisers can be, for example, esters of phosphoric acid, phthalic acid or sebacic acid. The plasticisers can be incorporated into the polymers before or after incorporation of the pigment compositions according to the invention. In order to achieve various colour shades, it is furthermore possible also to add fillers or other colouring constituents, such as white, coloured or black pigments, in any amounts to the high molecular weight organic substances, in addition to the pigment compositions according to the invention.

For pigmenting varnishes, paints and printing inks, the high molecular weight organic materials and the pigment compositions according to the invention are finely dispersed or dissolved in a common organic solvent or solvent mixture, if appropriate together with additives, such as fillers, other pigments, siccatives or plasticisers. A procedure can be followed here in which the individual components are dispersed or dissolved by themselves, or also several of them together, and only then are all the components brought together.

In colourations, for example of varnishes, polyvinyl chloride or polyolefins, the pigment compositions according to the invention are distinguished by good general pigment properties, such as good dispersibility, high tinctorial strength and purity, and good resistance to migration, heat and, in particular, light and weathering.

The following examples illustrate the invention.

EXAMPLE 1: 0.9 g of a scarlet red bisazo pigment (C. I. Pigment Red 166) of the formula

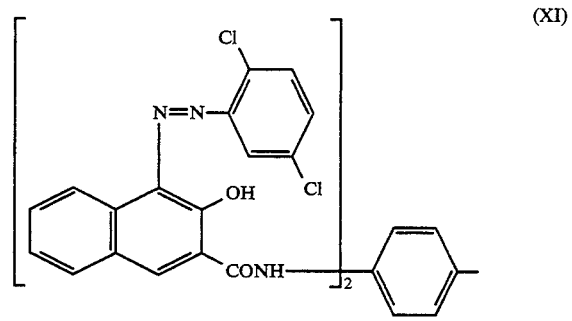

and 0.1 g of a nitroxyl compound of the formula

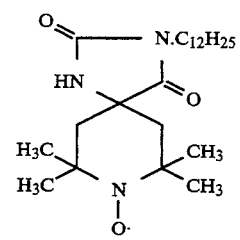

are suspended in 25 ml of methylene chloride by ultrasonic treatment for 3 minutes. The solvent is then distilled off and the residue is dried.

The resulting stabilised pigment is incorporated into an alkyd-melamine stoving enamel as follows.

0.4 g of pigment/nitroxyl mixture, 7.6 g of $TiO_2$, 9 ml of methyl isobutyl ketone and 30 g of stoving lacquer comprising 66.5 parts of alkyd resin ®ALKYDAL F27 (Bayer AG), 24.4 parts of melamine resin ®MEPRENAL TTK (Hoechst AG), 2.1 parts of xylene, 4.0 parts of ethylene glycol and 1.0 parts of silicone oil (1% in xylene) are mixed by customary methods. The resulting colour lake is spread onto aluminium sheets and stoved at 130° C. for 30 minutes.

A control coloured coating is likewise produced in the same manner, with the exception that the pigment is employed without addition of the nitroxyl compound.

The resistance of the resulting coloured coatings to weathering is determined in accordance with the WOM test according to DIN 53387 after weathering for 500 hours. The colouration obtained with addition of the nitroxyl compound has a significantly better resistance to weathering than the control coloured coating.

EXAMPLE 2

Example 1 is repeated, with the only exception that instead of the pigment of the formula XI, the same amount by weight of the bisazo pigment (C. I. Pigment Yellow 93) of the formula

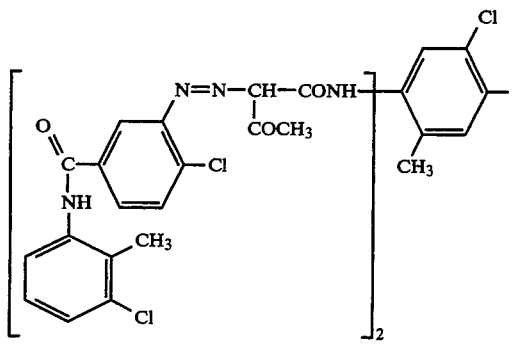

is employed. The coloured coating shows a significantly better resistance to weathering than the corresponding control coloured coating.

EXAMPLES 3-55

0.4 g of one of the pigments shown in column 1 in the following Table 1 and 0.08 g of one of the nitroxyl compounds shown in column 2 of Table 1 are incorporated separately, but otherwise in the same manner, into the same alkyd-melamine stoving enamel (white reduction) as described in Example 1 (method B). The resistance of the resulting coloured coatings and corresponding control coloured coatings without a nitroxyl compound to weathering is determined as described in Example 1. In all the examples shown, a better resistance to weathering can be detected than in the case of the corresponding control coloured coatings.

TABLE 1

| Example | I | II |
|---|---|---|
| 3 | C.I. Pigment Orange 34 | (structure) |
| 4 | C.I. Pigment Orange 34 | (structure) |
| 5 | C.I. Pigment Orange 34 | (structure) |
| 6 | C.I. Pigment Orange 34 | (structure) |
| 7 | C.I. Pigment Yellow 95 | (structure) |

TABLE 1-continued

| Example | I | II |
|---|---|---|
| 8 | C.I. Pigment Yellow 95 | $\left[\begin{array}{c} \text{2,2,6,6-tetramethyl-4-piperidinyl-N-oxyl} \end{array}\right]_2 R$, where $R$ = dimethyl terephthalate diester linker |
| 9 | C.I. Pigment Yellow 95 | 2,2,6,6-tetramethyl-4-piperidinyl-N-oxyl ester of lauric acid: $-O-C(=O)-(CH_2)_{10}CH_3$ |
| 10 | C.I. Pigment Yellow 95 | 2,2,6,6-tetramethyl-4-piperidinyl-N-oxyl ester of 1-naphthoic acid |
| 11 | C.I. Pigment Yellow 62 | 2,2,6,6-tetramethyl-4-piperidinyl-N-oxyl ester of 4-biphenylcarboxylic acid |
| 12 | C.I. Pigment Yellow 62 | $\left[\begin{array}{c} \text{2,2,6,6-tetramethyl-4-piperidinyl-N-oxyl} \end{array}\right]_2 R$, where $R$ = dimethyl terephthalate diester linker |
| 13 | C.I. Pigment Yellow 62 | 2,2,6,6-tetramethyl-4-piperidinyl-N-oxyl ester of lauric acid: $-O-C(=O)-(CH_2)_{10}CH_3$ |
| 14 | C.I. Pigment Yellow 62 | 2,2,6,6-tetramethyl-4-piperidinyl-N-oxyl ester of 1-naphthoic acid |
| 15 | C.I. Pigment Yellow 17 | 2,2,6,6-tetramethyl-4-piperidinyl-N-oxyl ester of 4-biphenylcarboxylic acid |

TABLE 1-continued

| Example | I | II |
|---|---|---|
| 16 | C.I. Pigment Yellow 17 | $\left[\begin{array}{c}\text{2,2,6,6-tetramethylpiperidin-N-oxyl-4-yl}\end{array}\right]_2 R$, where R = dimethyl terephthaloyl |
| 17 | C.I. Pigment Yellow 17 | 2,2,6,6-tetramethyl-1-oxyl-piperidin-4-yl dodecanoate: $\cdot\text{O—N}$ piperidine ring (2,2,6,6-tetramethyl) with 4-O—C(=O)—(CH$_2$)$_{10}$—CH$_3$ |
| 18 | C.I. Pigment Yellow 17 | 1-naphthoyl ester of 2,2,6,6-tetramethyl-1-oxyl-piperidin-4-ol |
| 19 | C.I. Pigment Red 177 | 4-biphenylcarbonyl ester of 2,2,6,6-tetramethyl-1-oxyl-piperidin-4-ol |
| 20 | C.I. Pigment Red 177 | $\left[\begin{array}{c}\text{2,2,6,6-tetramethylpiperidin-N-oxyl-4-yl}\end{array}\right]_2 R$, where R = dimethyl terephthaloyl |
| 21 | C.I. Pigment Red 177 | 2,2,6,6-tetramethyl-1-oxyl-piperidin-4-yl dodecanoate |
| 22 | C.I. Pigment Red 177 | 1-naphthoyl ester of 2,2,6,6-tetramethyl-1-oxyl-piperidin-4-ol |
| 23 | C.I. Pigment Red 188 | 4-biphenylcarbonyl ester of 2,2,6,6-tetramethyl-1-oxyl-piperidin-4-ol |

TABLE 1-continued

| Example | I | II |
|---|---|---|
| 24 | C.I. Pigment Yellow 188 | Bis(2,2,6,6-tetramethyl-1-oxyl-piperidin-4-yl) ester where R = dimethyl terephthalate linker |
| 25 | C.I. Pigment Yellow 188 | 2,2,6,6-tetramethyl-1-oxyl-piperidin-4-yl dodecanoate (O-C(=O)-(CH₂)₁₀-CH₃) |
| 26 | C.I. Pigment Yellow 188 | 2,2,6,6-tetramethyl-1-oxyl-piperidin-4-yl naphthalene-1-carboxylate |
| 27 | C.I. Pigment Blue 15:4 | 2,2,6,6-tetramethyl-1-oxyl-piperidin-4-yl biphenyl-4-carboxylate |
| 28 | C.I. Pigment Blue 15:4 | Bis(2,2,6,6-tetramethyl-1-oxyl-piperidin-4-yl) ester where R = dimethyl terephthalate linker |
| 29 | C.I. Pigment Blue 15:4 | 2,2,6,6-tetramethyl-1-oxyl-piperidin-4-yl dodecanoate (O-C(=O)-(CH₂)₁₀-CH₃) |
| 30 | C.I. Pigment Blue 15:4 | 2,2,6,6-tetramethyl-1-oxyl-piperidin-4-yl naphthalene-1-carboxylate |
| 31 | C.I. Pigment Red 170 | 2,2,6,6-tetramethyl-1-oxyl-piperidin-4-yl naphthalene-1-carboxylate |

TABLE 1-continued

| Example | I | II | |
|---|---|---|---|
| 32 | C.I. Pigment Yellow 95 | $\left[\begin{array}{c}H_3C\quad CH_3\\ \cdot O-N\diagdown\diagup\overset{H}{\underset{}{\diagup}}O-\overset{O}{\underset{\parallel}{C}}-\\ H_3C\quad CH_3\end{array}\right]_2$ | $-(CH_2)_8-$ |
| 33 | C.I. Pigment Red 177 | (same structure) | $-(CH_2)_8-$ |
| 34 | C.I. Pigment Red 244 | (same structure) | $-(CH_2)_8-$ |
| 35 | C.I. Pigment Yellow 110 | (same structure) | $-(CH_2)_8-$ |
| 36 | C.I. Pigment Red 244 | $\left[\begin{array}{c}H_3C\quad CH_3\\ \cdot O-N\diagdown\diagup\overset{H}{\underset{}{\diagup}}R\\ H_3C\quad CH_3\end{array}\right]_2$ | R = dimethyl terephthalate diester linker |
| 37 | C.I. Pigment Yellow 110 | (same structure) | R = dimethyl terephthalate diester linker |
| 38 | C.I. Pigment Red 244 | biphenyl-4-carboxylate ester of 4-hydroxy-2,2,6,6-tetramethylpiperidin-1-oxyl | |

TABLE 1-continued

| Example | I | II |
|---|---|---|
| 39 | C.I. Pigment Yellow 110 | biphenyl-4-carboxylic acid ester of 4-hydroxy-2,2,6,6-tetramethylpiperidine-1-oxyl |
| 40 | C.I. Pigment Red 244 | naphthalene-1-carboxylic acid ester of 4-hydroxy-2,2,6,6-tetramethylpiperidine-1-oxyl |
| 41 | C.I. Pigment Yellow 110 | naphthalene-1-carboxylic acid ester of 4-hydroxy-2,2,6,6-tetramethylpiperidine-1-oxyl |
| 42 | C.I. Pigment Red 170 | 2-(benzoyloxymethyl)benzoic acid ester of 4-hydroxy-2,2,6,6-tetramethylpiperidine-1-oxyl |
| 43 | C.I. Pigment Yellow 188 | bis-ester of phthalic acid with 4-hydroxy-2,2,6,6-tetramethylpiperidine-1-oxyl |
| 44 | C.I. Pigment Yellow 188 | N-octyl-N-(2,2,6,6-tetramethyl-1-oxylpiperidin-4-yl)benzamide |
| 45 | C.I. Pigment Yellow 188 | 4-(2,2,6,6-tetramethyl-1-oxylpiperidin-4-yl)phenyl benzoate |

TABLE 1-continued

| Example | I | II |
|---|---|---|
| 46 | C.I. Pigment Yellow 188 | [structure: bis(2,2,6,6-tetramethyl-1-oxyl-piperidin-4-yl) ester], R = 1,3-phenylene-dicarboxylate (isophthalate) |
| 47 | C.I. Pigment Yellow 188 | [structure: bis(2,2,6,6-tetramethyl-1-oxyl-piperidin-4-yloxy)], R = benzene-1,3,5-tricarboxylate |
| 48 | C.I. Pigment Yellow 188 | structure: 2,2,6,6-tetramethyl-1-oxyl-piperidine spiro-ketal with CH$_3$-C(CH$_2$O-)(CH$_2$-O-C(O)-(CH$_2$)$_{10}$CH$_3$) |
| 49 | C.I. Pigment Yellow 95 | structure: benzoyloxymethyl-benzoate of 2,2,6,6-tetramethyl-1-oxyl-piperidin-4-ol |
| 50 | C.I. Pigment Yellow 95 | [structure: bis(2,2,6,6-tetramethyl-1-oxyl-piperidin-4-yl) ester], R = phthalate (1,2-phenylene-dicarboxylate) |
| 51 | C.I. Pigment Yellow 95 | structure: N-octyl-N-(2,2,6,6-tetramethyl-1-oxyl-piperidin-4-yl) benzamide, C$_8$H$_{17}$ |
| 52 | C.I. Pigment Yellow 95 | structure: 2,2,6,6-tetramethyl-1-oxyl-piperidin-4-yl benzoate |

TABLE 1-continued

| Example | I | II |
|---|---|---|
| 53 | C.I. Pigment Yellow 95 | 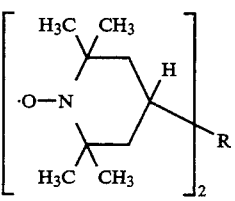 |
| 54 | C.I. Pigment Yellow 17 | 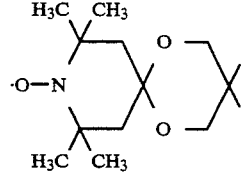 |
| 55 | C.I. Pigment Yellow 17 | 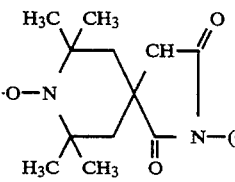 |

EXAMPLES 56–58:

0.7 g of C. I. Pigment Yellow 95 and 0.35 g of one of the nitroxyl compounds shown in the following Table 2 are mixed in the dry state with 700 g of polyethylene VESTOLEN A 6016 ® (Hüls) and 1.4 ) g of calcium carbonate MILICARB ®. The mixture is then extruded in a single-screw extruder twice at 200° C. The granules thus obtained are processed to sheets on an injection moulding machine at 200° C. The resistance to weathering is determined by weathering the sheets as described for the coloured coatings in Example 1. In all the examples, a better resistance to weathering can be determined than in the case of control sheets produced correspondingly without nitroxyl compounds.

TABLE 2

| Example | Nitroxyl compound |
|---|---|
| 56 | 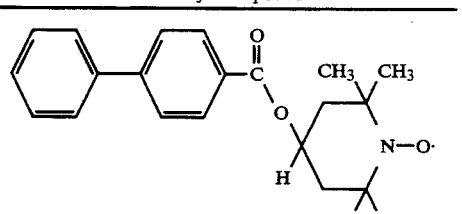 |
| 57 | 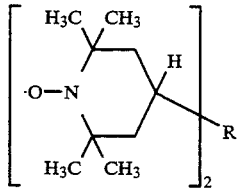 |
| 58 | 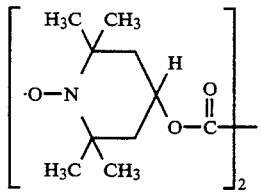 |

EXAMPLES 59–61:

0.5 g of C. I. Pigment Yellow 95, 0.1 g of one of the nitroxyl compounds shown in the following Table 3 and 16.2 g of a nitrocellulose printing ink comprising 11 g of nitrocellulose A 250, 9 g of DOWANOL PM ® (Dow Chem.), 20 g of ethyl acetate and 60 g of ethanol are mixed by customary methods. The resulting printing ink is spread onto paper. The resistance to weathering is determined by exposure of the colourations to light in accordance with the fadeometer test for 500 hours. In all the examples, a better resistance to weathering can be determined than in the case of control colourations produced correspondingly without nitroxyl compounds.

TABLE 3

| Example | Nitroxyl compound |
|---|---|
| 59 | 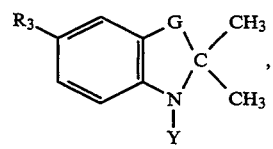 |
| 60 | 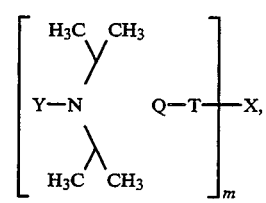 |
| 61 | 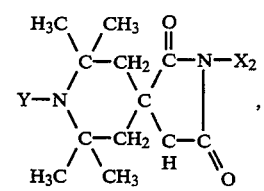 |

EXAMPLES 62–64:

Examples 59–61 are repeated with the only exception that instead of C. I. Pigment Yellow 95, the same amount by weight of C. I. Pigment Yellow 188 is used. A better light fastness than in the case of corresponding control colourations without a nitroxyl compound can also be determined in these examples.

The classes to which the pigments used in Examples 3–64 belong are shown in the following Table 4.

TABLE 4

| C.I. designation | Pigment class |
|---|---|
| C.I. Pigment Yellow 17 | Bisazo pigment |
| C.I. Pigment Yellow 62 | Laked monoazo pigment |
| C.I. Pigment Yellow 95 | Bisazo pigment |
| C.I. Pigment Yellow 110 | Isoindolinone pigment |
| C.I. Pigment Yellow 188 | Bisazo pigment |
| C.I. Pigment Orange 34 | Bisazo pigment |
| C.I. Pigment Red 170 | Monoazo pigment |
| C.I. Pigment Red 177 | Anthraquinone pigment |
| C.I. Pigment Red 244 | Diaminoanthraquinonyl pigment |
| C.I. Pigment Blue 15:4 | Copper phthalocyanine pigment |

What is claimed is:

1. A light-stabilised pigment composition consisting essentially of
   a) at least one organic pigment chosen from the group consisting of azo pigments, quinacridones, phthalocyanines, indanthrones, flavanthrones, pyranthrones, anthraquinones, perylenes, dioxazines, perinones, thioindigo, isoindolines, isoindolinones and metal complexes; and
   b) 1 to 100% by weight, based on the pigment, of a nitroxyl compound of the formula

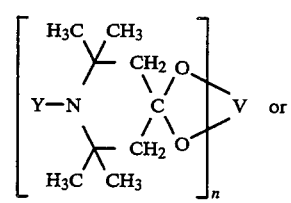 (III)

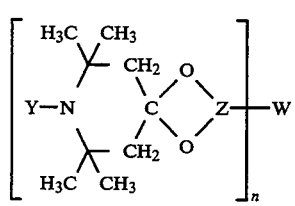 (IV)

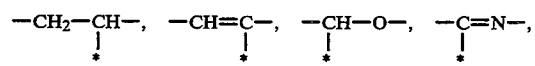 (IX)

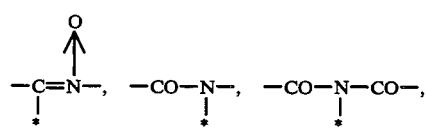 (VI)

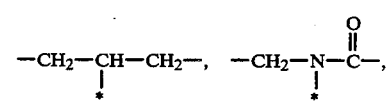 (VII)

wherein $R_3$ is $C_1$-$C_{18}$alkyl or $C_1$-$C_{18}$alkoxy;
G is a divalent group of the formula $-CR_4=CH-$ or $-CHR_4-CH_2-$;
$R_4$ is $C_1$-$C_{18}$alkyl;
Q is a group of the formula

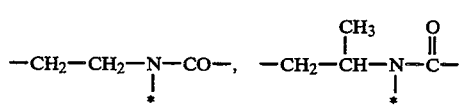

in which the bond labelled * is the bond leading to T;

T is a direct bond or a group of the formula

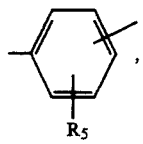

in which $R_5$ is hydrogen, halogen or $C_1$-$C_4$alkyl, or —$(CH_2)_r$—,
in which r is 1 or 2;
m is the number 1, 2, 3, 4 or 6;
X, when m=1, is hydrogen, $C_1$-$C_{18}$alkyl, phenyl which is unsubstituted or substituted by $C_1$-$C_4$alkyl, $C_1$-$C_4$alkoxy, phenyl or halogen, or, under the condition that T, if bonded to a nitrogen atom, is not a direct bond, is a group of the formula —O—CO—$NR_6R_7$, —$OSO_2$—$NR_6R_7$, —OCO—$R_7$, —$COOR_7$, —$CONR_6R_7$, —$NR_6$—$COR_7$, —$NR_6$—$CONR_6R_7$, —$OR_7$, —$NR_6R_7$ or

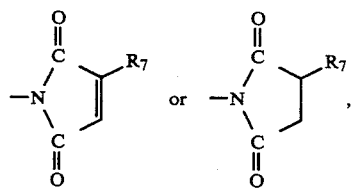

in which $R_6$ is hydrogen or $C_1$-$C_{18}$alkyl, $R_7$ is $C_1$-$C_{18}$alkyl, $C_2$-$C_{12}$alkenyl, $C_5$-$C_{12}$cycloalkyl, or phenyl or naphthyl which is unsubstituted or substituted by $C_1$-$C_4$alkyl, $C_1$-$C_4$alkoxy, halogen, phenyl or nitro, or a group —$(CH_2)_s$—$CHR_8R_9$, s is zero, 1, 2, or 3, $R_8$ is hydrogen, methyl or phenyl and $R_9$ is —OH, halogen or a group —$COOCH_3$ or —$COOC_2H_5$;

X, when m=2, is a group of the formula —$(CH_2)_p$ or, under the condition that T, if bonded to a nitrogen atom, is not a direct bond, is a group of the formula —O—$(CH_2)_p$—O—, —$NR_6$—$(CH_2)_p$—$NR_6$—, —OCO—M—COO—, —$NR_6$—CO—M—CO—$NR_6$—, —OCO—NH—M—NH—COO— or —$NR_6$—CONH—NH—CO—$NR_6$—, in which M is —$(CH_2)_p$—,

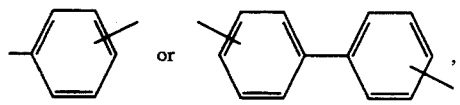

and p is a number between 2 and 10;
X, when m=3, is a group

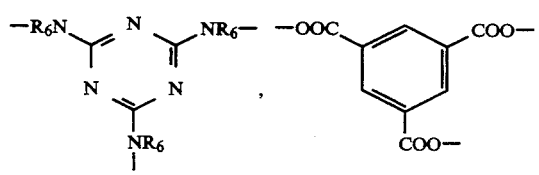

-continued

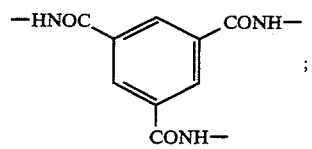

X, when m=4, is a group

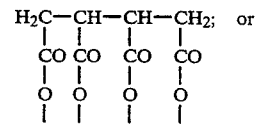

X, when m=6, is a group

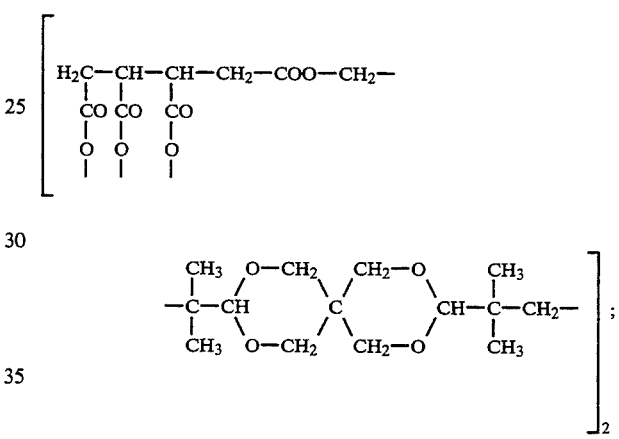

$X_2$ is $C_1$-$C_{18}$alkyl;
n is the number 1 or 2;
V, when n=1, is $C_2$-$C_8$alkylene or hydroxyalkylene or $C_4$-$C_{22}$acyloxyalkylene; or
V, when n=2, is the group $(—CH_2)_2C(CH_2—)_2$ or

Z is a group of the formula

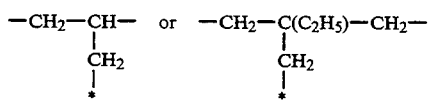

in which the bond labelled with * is the bond leading to W;
W, when n=1, is a group —$OCOR_{10}$, in which $R_{10}$ is $C_1$-$C_{18}$alkyl, or phenyl or naphthyl which is unsubstituted or substituted by $C_1$-$C_4$alkyl, $C_1$-$C_4$alkoxy or halogen; or
W, when n=2, is a group of the formula —O—CO—$(CH_2)_p$—COO— or

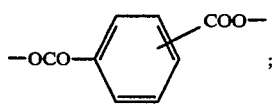

and Y is O.

2. A pigment composition according to claim 1, wherein a pigment of the isoindoline, isoindolinone, metal complex, monoazo and, in particular, of the bisazo, quinacridone, phthalocyanine, anthraquinone and perylene series is used.

3. A pigment composition according to claim 1, wherein the pigment is used in a fine form having an average particle size of 0.005 to 0.1 μm.

4. A pigment composition according to claim 1, wherein the nitroxyl compound is employed in an amount of 5-100% by weight, based on the pigment.

5. A pigment composition according to claim 1, wherein an organic or inorganic salt of the nitroxyl compound is used.

6. A pigment composition according to claim 1, wherein a nitroxyl compound of the formula IV, IX or VI is used.

7. A pigment composition according to claim 1, wherein a nitroxyl compound of the formula

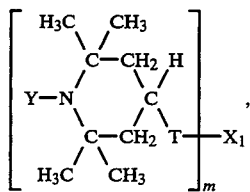 (VIII)

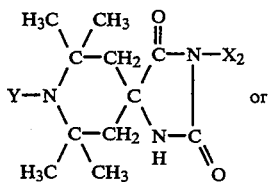 (IX)

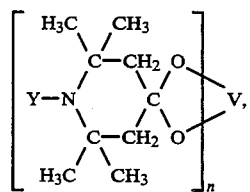 (X)

is used, in which
T is a direct bond,
m is 1, 2 or 3,
$X_1$, if m=1, is $C_1$-$C_{18}$alkyl, —OCO—$R_7$, —NR$_6$—CO$R_7$ or

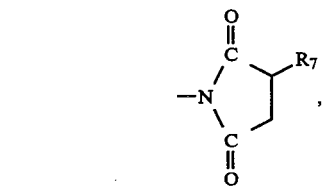

in which $R_6$ is hydrogen or $C_1$-$C_{18}$alkyl and $R_7$ is $C_1$-$C_{18}$alkyl, or phenyl or naphthyl which is un-substituted or substituted by $C_1$-$C_4$alkyl, $C_1$-$C_4$alkoxy, phenyl or halogen, and, if m=2, is a group —OCO—$(CH_2)_p$—OCO— or —NR$_6$CO—$(CH_2)_p$-CONR$_{15}$—, in which p is a number between 2 and 8,

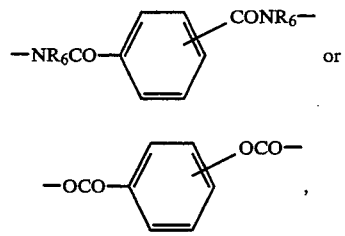

and,
if m=3, is a group

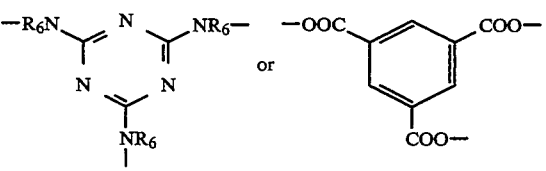

$X_2$ is $C_1$-$C_{18}$alkyl,
n is the number 2,
V is the group $(—CH_2)_2C(CH_2—)_2$ or

and
Y is O.

8. A pigment composition according to claim 7, wherein a nitroxyl compound of the formula VIII or IX, in which T is a direct bond, m is 1, $X_1$ is benzoyloxy or naphthoyloxy and $X_2$ is $C_8$-$C_{18}$alkyl, is used.

9. A process for light- and weather-stabilisation of pigments chosen from the group consisting of azo pigments, quinacridones, phthalocyanines, indanthrones, flavanthrones, pyranthrones, anthraquinones, perylenes, dioxazines, perinones, thioindigo, isoindolines, isoindolinones and metal complexes, which process consists essentially of mixing or coating the pigment particles with 1 to 100% by weight, based on the pigment, of a nitroxyl compound of the formula

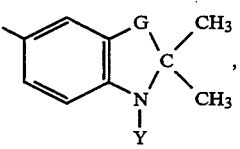 (III)

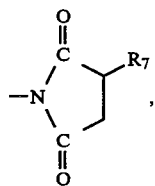 (IV)

-continued

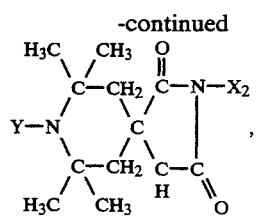 (IX)

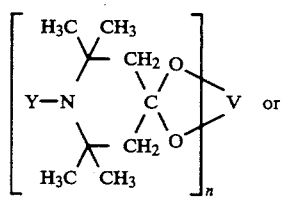 (VI)

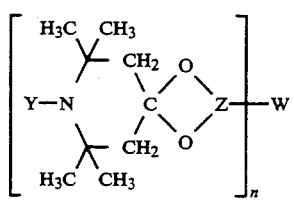 (VII)

is used, in which $R_3$ is $C_1$-$C_{18}$alkyl or $C_1$-$C_{18}$alkoxy;

G is a divalent group of the formula —$CR_4$=CH— or —$CHR_4$-$CH_2$-;

$R_4$ is $C_1$-$C_{18}$alkyl;

Q is a group of the formula

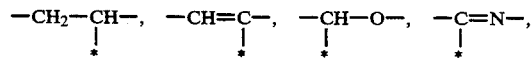

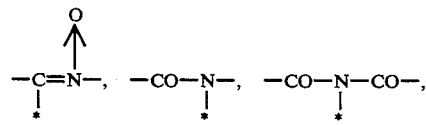

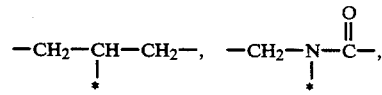

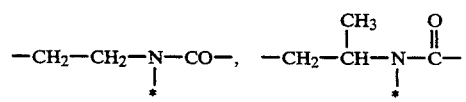

or 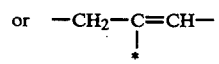

in which the bond labelled * is the bond leading to T;

T is a direct bond or a group of the formula

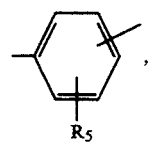, in which $R_5$ is hydrogen, halogen or $C_1$-$C_4$alkyl, or —$(CH_2)_r$—, in which r is 1 or 2;

m is the number 1, 2, 3, 4 or 6;

X, when m=1, is hydrogen, $C_1$-$C_{18}$alkyl, phenyl which is unsubstituted or substituted by $C_1$-$C_4$alkyl, $C_1$-$C_4$alkoxy, phenyl or halogen, or, under the condition that T, if bonded to a nitrogen atom, is not a direct bond, is a group of the formula —O-CO—$NR_6R_7$, —$OSO_2$—$NR_6R_7$, —OCO—$R_7$, —$COOR_7$, —$CONR_6R_7$, —$NR_6$—$COR_7$, —$NR_6$—$CONR_6R_7$, —$OR_7$, —$NR_6R_7$ or

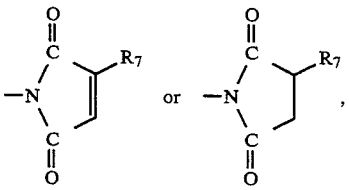

in which $R_6$ is hydrogen or $C_1$-$C_{18}$alkyl, $R_7$ is $C_1$-$C_{18}$alkyl, $C_2$-$C_{12}$alken yl, $C_5$-$C_{12}$cycloalkyl, or phenyl or naphthyl which is unsubstituted or substituted by $C_1$-$C_4$alkyl, $C_1$-$C_4$alkoxy, halogen, phenyl or nitro, or a group —$(CH_2)_s$—$CHR_8R_9$, s is zero, 1,2 or 3, $R_8$ is hydrogen, methyl or phenyl and $R_9$ is —OH, halogen or a group —$COOCH_3$ or —$COOC_2H_5$;

X, when m=2, is a group of the formula —$(CH_2)_p$ or, under the condition that T, if bonded to a nitrogen atom, is not a direct bond, is a group of the formula —O—$(CH_2)_p$—O—, —$NR_6$—$(CH_2)_p$—$NR_6$—, —OCO—M—COO—, —$NR_6$—CO—M—CO—$NR_6$—, —OCO—NH—M—NH—COO— or —$NR_6$, —CONH —M—NH-CO—$NR_6$—, in which M is —$(CH_2)_p$—,

and p is a number between 2 and 10;

X, when m=3, is a group

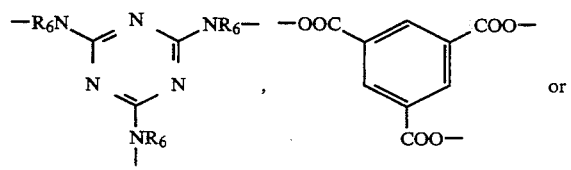

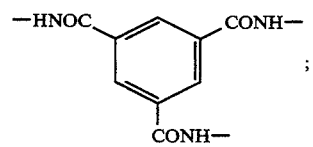

X, when m=4, is a group

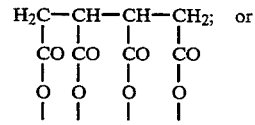

X, when m=6, is a group

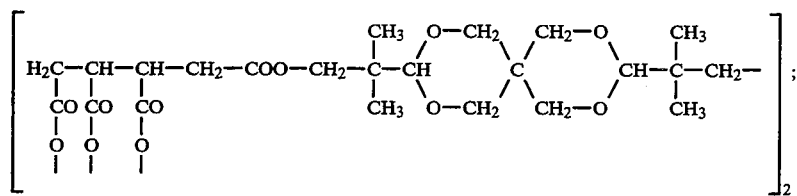

$X_2$ is $C_1$-$C_{18}$alkyl;

n is the number 1 or 2;

V, when n=1, is $C_2$-$C_8$alkylene or hydroxyalkylene or $C_4$-$C_{22}$-acyloxyalkylene; or V, when n=2, is the group $(-CH_2)_2C(CH_2-)_2$ or

Z is a group of the formula

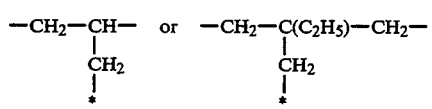

in which the bond labelled with * is the bond leading to W; W, when n=1, is a group $-OCOR_{10}$, in which $R_{10}$ is $C_1$-$C_{18}$alkyl, or phenyl or naphthyl which is unsubstituted or substituted by $C_1$-$C_4$alkyl, $C_1$-$C_4$alkoxy or halogen; or W, when n=2, is a group of the formula $-O-CO-(CH_2)_p-COO-$ or

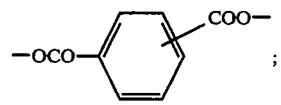

and

Y is O.

10. A high molecular weight organic material containing a pigment composition according to claim 1.

11. A high molecular weight organic material according to claim 10, which is a varnish.

12. A high molecular weight organic material according to claim 11, which is an automobile finish.

* * * * *